April 21, 1964 V. MILITANO ETAL 3,129,715
MOTOR DRIVEN WINDING MECHANISM
Filed Aug. 15, 1961 2 Sheets-Sheet 2

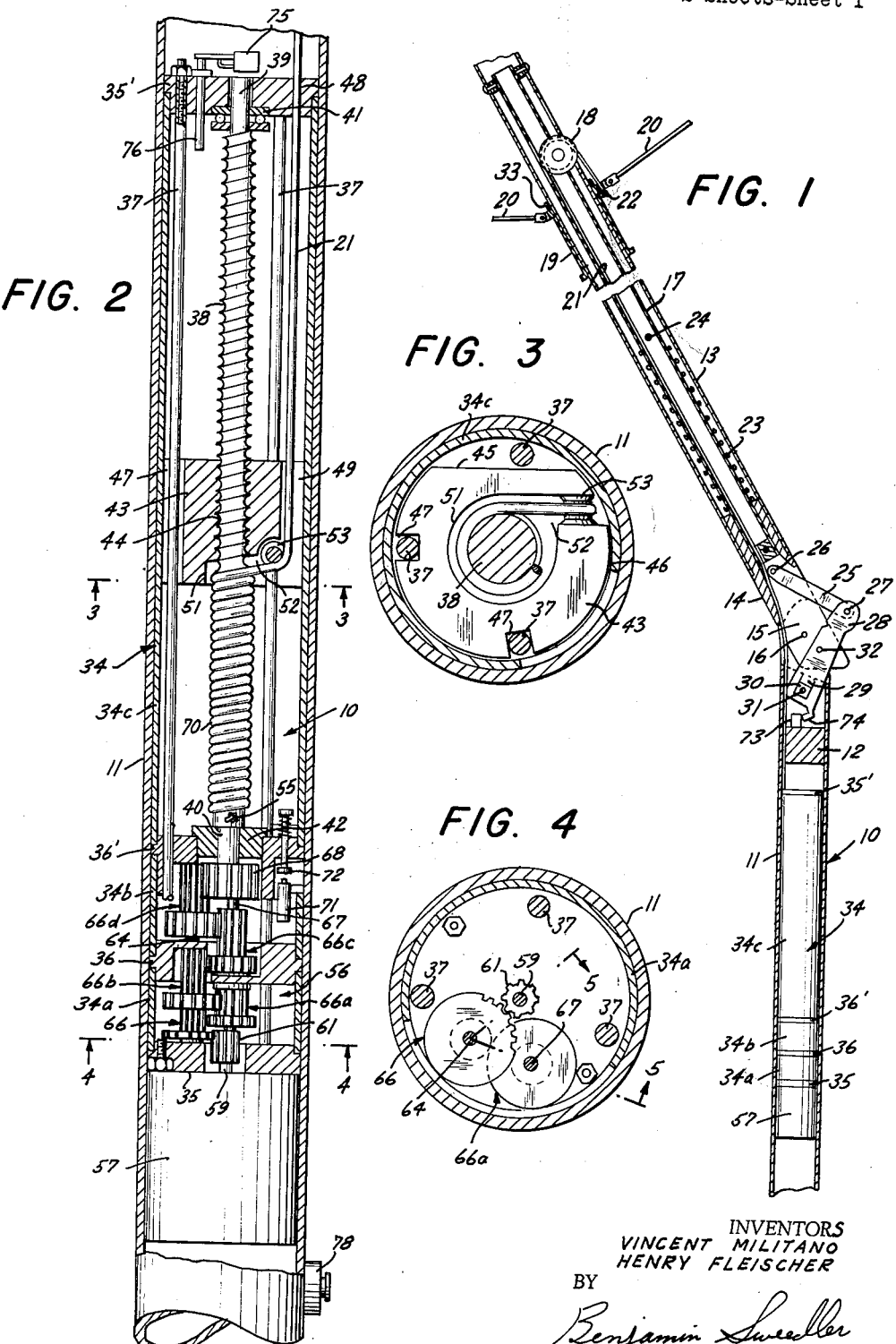

INVENTORS
VINCENT MILITANO
HENRY FLEISCHER
BY
Benjamin Sweedler
ATTORNEY

United States Patent Office 3,129,715
Patented Apr. 21, 1964

3,129,715
MOTOR DRIVEN WINDING MECHANISM
Vincent Militano, Bethpage, and Henry Fleischer, North Bellmore, N.Y., assignors to Finkel Outdoor Products, Inc., New York, N.Y., a corporation of New York
Filed Aug. 15, 1961, Ser. No. 131,665
13 Claims. (Cl. 135—20)

This invention relates to a reeling or winding device for winding-up and paying-out a flexible member, such as, a cable or rope, and more particularly is directed to a motor driven wind up mechanism that can be installed in a narrowly confined space, for example, in the hollow pole of a garden umbrella, including tiltable umbrellas, flag poles, and other confined spaces, for winding-up and paying-out a cable, rope or other member by which, in the case of umbrellas the raising, lowering, or both raising and lowering movement of the umbrella canopy can be effected. In the case of a tiltable umbrella, tilting movement as well as subsequent return of the tilted canopy to its vertical position can be effected.

Garden, beach and other large umbrellas are known which are provided with mechanism for opening the umbrellas by winding up a cable or rope attached to the runner. Also known are tiltable umbrellas in which upon continued winding of the cable or rope after opening of the umbrella the umbrella is tilted and, conversely, upon paying out the cable or rope the tilted canopy is returned to its vertical position and then closed.

It is an object of this invention to provide a motor-driven winding and/or paying-out mechanism which is adapted to be contained in a narrow confined space, for example, in the hollow pole of a garden umbrella including tiltable umbrellas and in other confined spaces where such mechanisms can be utilized, for example, in a flag pole to raise and lower a flag and in other applications.

Another object is to provide a self-contained, motor-driven unit having a generally elongated configuration and small transverse dimensions for winding-up and paying-out a flexible element, such as, a cable, rope or other member extending from such unit in a direction generally parallel to its longitudinal axis.

Other objects and advantages of this invention will be apparent from the following detailed description thereof.

The winding mechanism of this invention, includes an elongated, threaded winding member whch is rotatably drive by a reversible electric motor, and a non-rotatable guiding member in threaded engagement with the winding member for travel along the latter in response to rotation of the winding member, the cable or rope having one end fixed to the winding member and extending generally tangentially from the surface thereof, preferably through the guiding member, and from the latter out in a direction parallel to the longitudinal axis of the winding member. Upon rotation of the winding member in one direction, such rotation and the consequent axial movement of the guiding member combine to wrap or wind the cable or rope on the winding member and thereby exert a pull on on the cable or rope. Rotation of the winding member in the opposite direction and the consequent axial movement of the guiding member combine to pay-out the cable, rope or other flexible member.

A speed reducing gear train is operatively connected between the reversible electric motor and the screw threaded winding member so as to drive the latter at a much slower rotational speed than the motor shaft and thereby effect a substantial magnification of the torque exerted on the winding member.

The above, and other objects, features and advantages of the invention, will be apparent from the following detailed description of an illustrative embodiment thereof which description is to be read in connection with the accompanying drawings forming a part hereof, and wherein:

FIGURE 1 is a fragmentary vertical section through a tiltable garden umbrella operated by a motor-driven unit embodying this invention, and with the umbrella being shown in a tilted position;

FIGURE 2 is an enlarged vertical section through the motor-driven unit embodying this invention;

FIGURE 3 is an enlarged horizontal section taken along the line 3—3 on FIGURE 2;

FIGURE 4 is an enlarged horizontal section taken along the line 4—4 on FIGURE 2;

Figure 5:
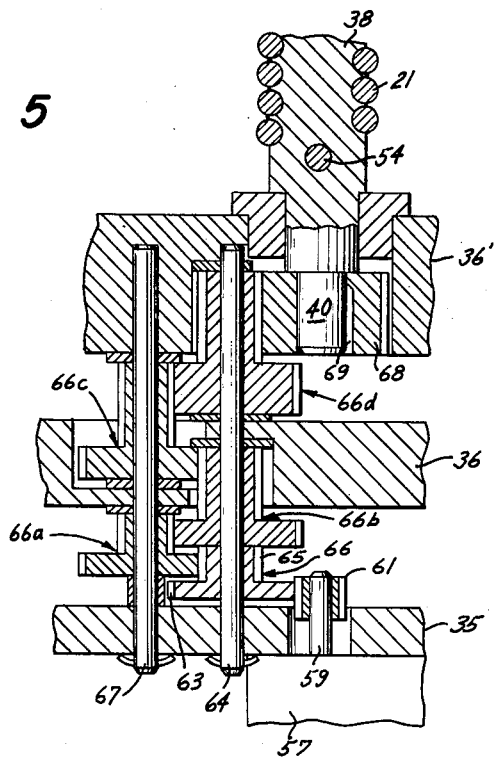
FIGURE 5 is an enlarged vertical section through a speed reducing gear train included in the unit of FIGURE 2 taken along the lines 5—5 in FIGURE 4.

Referring to FIGURE 1 of the drawing, the winding mechanism embodying the invention is a self-contained unit 10 which in the embodiment shown in the drawings is cylindrical as preferred, but can be of any desired shape. In FIGURE 1 the winding mechanism is shown associated with a tiltable garden umbrella of the type disclosed in United States Letters Patent No. 2,721,569. This tiltable garden umbrella includes a lower hollow pole 11 accommodating the unit 10 and provided with a casting 12 disposed in the upper end thereof. A hollow upper pole 13 has a casting 14 secured to its lower end and is provided with an extending portion 15 which is pivoted, as at 16, between upwardly directed extensions of casting 12. A push tube 17 is reciprocable within hollow pole 13 and, near its upper end, carries a rotatable pulley 18 which extends through suitable slots in push tube 17 and in upper pole 13. A runner 19 is slidable along upper pole 13, and the usual stretchers 20 of the umbrella are pivotally fastened to runner 19 and to the ribs of the umbrella (not shown) so as to effect raising and lowering of the umbrella in response to movement of runner 19 up and down, respectively, on the upper pole 13. A cable 21, desirably of nylon, has one end fastened to the runner 19, as at 22, passes over pulley 18, down through push tube 17, and through castings 12 and 14 to the mechanism in casing 34 for winding-up and paying-out the cable, as hereinafter described in detail.

A loaded helical compression spring 23 extends around the lower portion of push tube 17 and has one end pinned, as at 24, or otherwise suitably secured to the push tube, while its other end bears against the upper portion of casting 14. A link 25 has one end pivotally connected, as at 26, to the lower end of push tube 17, while the opposite end of link 25 is pivotally connected, as at 27, to one end of a link 28. The link 28 has a slot 29 adjacent its other end slidably receiving a shoe 30 which is pivoted, as at 31, on casting 12. Further, link 28 is pivotally connected intermediate its ends, as at 32, to the extension 15 of casting 14, with pivots 16 and 32 being spaced from each other so that relative angular displacement of links 25 and 28 is effective to cause tilting of upper pole 13 relative to lower pole 11. A stop ring or other stop member 33 is fastened on upper pole 13 at a suitable location above runner 19 when the latter is in the umbrella open position so that, when the runner engages stop ring 33, as in FIGURE 1, the stretchers 20 are positioned to fully open the canopy of the umbrella.

In the above described tiltable garden umbrella, spring 23 urges push tube 17 upwardly relative to pole 13 and thereby tends to increase the angle between links 25 and 28 until link 28 engages pivot 16 for maintaining the upper pole 13 in a vertical position. Assuming that the umbrella is initially in a closed position, in which case runner 19 is disposed on the lower portion of pole 13, the umbrella may be opened by pulling downwardly on cable 21 within the umbrella pole so as to effect elevation of runner 19 into engagement with stop ring 33. If it is desired to tilt the umbrella, cable 21 is further pulled downwardly within the umbrella pole and, since runner 19 cannot move further upward by reason of its engagement with stop ring 33, the continued downward pull exerted on cable 21 causes downward movement of both pulley 18 and push tube 17. This downward movement of push tube 17 effects a downward thrust on link 25 whereby the pivotal connection 27 between links 25 and 28 is moved outwardly to angularly displace link 28 and thereby cause tilting of upper pole 13 relative to lower pole 11.

When it is desired to return the umbrella to its vertical position, paying-out of cable 21 within the umbrella pole initially permits spring 23 to displace push tube 17 upwardly within upper pole 13, and such upward movement of the push tube acts through link 25 to pivot link 28 in the direction for displacing upper pole 13 back to its vertical position. When the upper pole has returned to its vertical position, which is limited by engagement of link 28 against the pivot 16, further paying-out of cable 21 within the umbrella pole permits downward movement of runner 19 along upper pole 13, and thereby effects closing of the umbrella canopy.

From the above, it is seen that the opening and closing of the umbrella, as well as its tilting movements, are effected by winding-up and paying-out cable 21 within the umbrella pole, all as fully disclosed in said patent 2,721,569.

The present invention provides a motor-driven unit for winding-up and paying-out cable 21 within the umbrella pole constructed and arranged so as to fit within the laterally confined space in lower pole 11. As is shown in FIGURE 2, the unit embodying this invention has an elongated cylindrical shape of relatively small diameter so that it can be conveniently accommodated in the lower pole 11 of the above-described tiltable garden umbrella, or used with any other type of mechanism having a cable, rope or other elongated flexible element that is wound-up and thus pulled and payed-out, and thus permits a force to be exerted, the opposite of the pulling force, to effect the operation thereof.

In the embodiment of the invention shown in the drawings, the unit 10 comprises a multi-part upper casing 34 and an abutting lower motor housing 57. The casing is constituted of sections 34a, 34b and 34c held together by tie rods 37 as hereinafter described. A base plate 35 is suitably secured to the lowermost section 34a as shown in FIGURE 2. A cover plate 35' is secured to the upper end of section 34c. Intermediate supporting and re-enforcing plate or collar 36' is positioned between sections 34c and 34b, and a second plate or collar 36 is positioned between sections 34b and 34a. Spaced longitudinally extending tie rods 37 are fastened, at their opposite ends, to the base plate 35 and the cover plate 35' to secure the casing parts in assembled relation. While the drawing shows three such rods 37, any desired number can be used.

A longitudinally elongated member 38 is provided with spindles 39 and 40 extending axially from its opposite ends and journalled in bearings 41 and 42 which are centrally located in cover plate 35' and supporting plate 36', respectively, so that the axis of winding member 38 is substantially coaxial with cylindrical casing 34. The surface of winding member 38 is formed with a helical or screw thread having a pitch or axial distance between the crests of adjacent threads approximately equal to the diameter of the cable or rope 21 to be wound on member 38. The root and sides of the thread are rounded so as to closely receive turns of the cable or rope 21 between the threads on the surface of member 38, whereby such threads position the turns of the cable or rope wound on member 38.

A guiding member 43 has a central bore extending therethrough which is internally threaded, as at 44 (FIGURE 2), and which is in threaded engagement with the screw thread on wind-up member 38. Guiding member 43 has a flat side surface 45 and an arcuate surface 46. Flat surface 45 is spaced from the inner surface of section 34c to provide a segmental clearance in which one of the tie rods 37 is disposed (FIGURE 3). The arcuate surface 46 is formed with a pair of slots 47 extending parallel to the axis of wind-up member 38 and slidably receiving the remaining two tie rods 37, which tie rods prevent turning of guiding member 43 which is displaced axially along wind-up member 38 in response to rotation of the latter.

Cable 21 enters casing 34 through an opening 48 in cover plate 35' and extends parallel to the axis of wind-up member 38 into a slot 49 formed in the arcuate surface 46 of guiding member 43. The lower portion of the central bore of guiding member 43 is counterbored or of enlarged diameter and formed with a smooth surface, as at 51. A groove or slot 52 extends generally tangentially from the periphery of the counterbored surface 51 to the base of slot 49. A grooved roller 53 is rotatably mounted within guiding member 43 at the junction of the slots 49 and 52. Thus the cable or rope 21 passes through slot 49, around roller 53, and then tangentially onto the screw threaded surface of wind-up member 38 within the counterbore.

The end of cable 21 remote from the end which is attached to runner 19 of the umbrella is suitably secured to the lower end of wind-up member 38. For example, the lower end of wind-up member 38 may be formed with a generally diametrically extending bore 54 in which the end of cable or rope 21 is retained by a terminal knot 55 thereon.

Member 38 is rotated by a motor-driven assembly including a speed reducing gear train 56 disposed in sections 34a and 34b and a reversible electric motor disposed within the cylindrical housing 57 and adapted to be energized either by battery 58 (FIGURE 6) also contained within housing 57 or from electrical supply lines. The speed reducing gear train 56 is connected between the shaft 59 of the reversible electric motor and the spindle 40 of wind-up member 38 so as to drive the latter at a speed less than the rotational speed of motor shaft 59, thereby to exert a correspondingly increased torque on wind-up member 38. The motor shaft 59 is coaxial with the axis of wind-up member 38. As is particularly in FIGURES 4 and 5, the speed reducing gear train 56 includes a pinion or small diameter spur gear 61 secured on motor shaft 59, as by a key or set screw, and meshing with an idler gear 63 of larger diameter rotatable on a rod 64 which is supported, at its opposite ends, by supporting plate 36' and base plate 35 and extends parallel to the axis of motor shaft 59, but at one side of the latter.

Gear 63 is integral, or otherwise connected for rotation with a pinion or smaller diameter spur gear 65 to form, with the latter, a step-down idler gear set 66 which is freely rotatable on rod 64. The small gear 65 of idler gear set 66 meshes with the relatively large gear of a similar step-down idler gear set 66a freely rotatable on a rod 67 which is supported, at its opposite ends, by supporting plate 36' and base plate 35 and extends parallel to rod 64. The relatively small gear of gear set 66a meshes with the relatively large gear of a similar step-down idler gear set 66b freely rotatable on rod 64, and the relatively small gear of gear set 66b meshes in turn with the relatively large gear of a similar step-down idler gear set 66c freely rotatable on rod 67. The relatively small gear of gear set 66c meshes with the relatively large gear of a similar step-down idler gear set 66d freely rotatable on rod 64, and the relatively small gear of gear set 66d meshes with a relatively larger gear 68 which is fixed on spindle 40, as by a set screw or key 69.

When the motor in housing 57 rotates wind-up member 38 through gear train 56 in the direction for effecting upward movement of guide member 43, the latter guides cable or rope 21 onto the threaded surface of wind-up member 38 where it is wrapped in contiguous turns or convolutions, as at 70 in FIGURE 2. The progressive wrapping of cable 21 on the surface of wind-up member 38 produces a downward pull on cable 21. In the case of the installation of unit 10 in the previously described tiltable garden umbrella, such downward pull on cable 21 initially causes opening of the canopy of the umbrella and then the tilting of the upper pole 13 thereof. When the reversible electric motor rotates wind-up member 38 in the opposite direction so that guide member 43 moves downwardly, the turns 70 of cable 21 are unwrapped from the surface of member 38 and the cable is payed-out from casing 34, and thereby permits the return of upper pole 13 to its vertical position followed by downward movement of runner 19 for closing the canopy of the umbrella.

In order to insure that the operation of the reversible electric motor will be halted when the umbrella is in its fully closed position, the electric circuit for energizing the motor includes a normally closed limit switch 71 mounted in casing 34 below supporting plate 36'. Switch 71 is actuated to its open position by a plunger 72 projecting slidably through supporting plate 36' and being depressed downwardly by guide member 43 when the latter reaches the lower portion of wind-up member 38, at which time the umbrella is in its fully closed position. Further, in order to halt operation of the motor when the umbrella is in its fully open and tilted position, the electric circuit for energizing the motor includes a normally closed limit switch 73 (FIGURE 1) mounted on casting 12 and engageable by a projection 74 extending from link 28 when the latter is rocked, as in FIGURE 1, to dispose upper pole 13 in its tilted position.

An emergency switch 75 is mounted atop the cover plate 35' of the winding unit in order to de-energize the motor when it is being driven in the direction for winding up the cable 21 on member 38 to open the umbrella, in the event cable 21 should snap before the umbrella reaches its fully open and tilted position whereat the normally closed limit switch 73 is opened. Switch 75 is opened by a plunger 76 projecting into the casing 34 through the cover plate 35', which plunger is actuated by the guiding member 43 when it reaches the upper portion of windup member 38.

Figure 6:
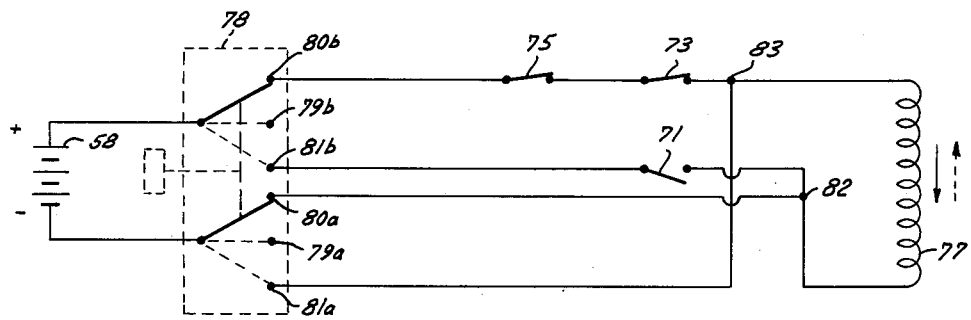
FIGURE 6 is a wiring diagram of an electrical circuit that may be employed in connection with the motor-driven unit embodying the invention.

As is shown in FIGURE 6, a suitable circuit for energizing the field winding 77 of the electric motor from the battery 58 or other supply of electricity includes a manually actuable D.P.D.T. control switch 78 conveniently mounted on lower pole 11 (FIGURE 2) and having one pair of contacts 79a and 79b, a second pair of contacts 80a and 80b and a third pair of contacts 81a and 81b, which are alternatively opened and closed. The contacts 79a and 79b are not connected to the motor circuit and thus provide an "off" position for the control switch 78. One side of battery or electric current source 58 is connected through contacts 80a and 81a to the opposite ends of winding 77, as at 82 and 83, while the opposite side of battery or source 58 is connected through contact 80b, emergency switch 75 and limit switch 73 to the end 83 of winding 77, and also through contact 81b and limit switch 71 to the end 82 of the field winding 77.

FIGURE 6 illustrates the condition of the circuit when the umbrella is in its fully closed position, so that limit switch 71 is open, and immediately following actuation of switch 78 to close the pair of contacts 80a and 80b, so that current flows from battery 58 over closed contact 80b, closed emergency switch 75 and closed limit switch 73, through winding 77 in the direction indicated by the arrow in full line, and back to the battery through closed contact 80a, and thereby drives the motor in the direction for winding up cable 21 on member 38. Although limit switch 71 closes upon upward movement of guiding member 43 out of contact with plunger 72, contact 81b which is in series with limit switch 71 remains open and thereby avoids short circuiting of winding 77. The umbrella may be opened and tilted to any desired angle, and the motor de-energized when the desired angle of tilt has been obtained by manipulating switch 78 to open contacts 80a and 80b and close contacts 79a and 79b.

When the switch 78 is maintained in the position shown in FIGURE 6 with contacts 80a and 80b closed and the umbrella is fully opened and then tilted to its predetermined maximum tilt, limit switch 73 is opened by projection 74 to halt operation of the motor.

When the umbrella is to be returned to its vertical position and closed, switch 78 is manipulated to open contacts 80a and 80b and to close contacts 81a and 81b. Upon such manipulation of switch 78, current flows from battery 58 over closed contact 81b and closed limit switch 71, through winding 77 in the direction of the arrow appearing in broken line, and back to battery 58 over closed contact 81a, thereby to effect rotation of the motor in the direction for unwinding cable 21 from member 38 until operation of the motor is halted by engagement of guide member 43 with plunger 72 so as to open limit switch 71.

Should the cable 21 snap when the motor is being driven in the direction for winding up the cable to open the umbrella, the emergency switch 75 is opened by the guiding member 43 when the latter engages the plunger 76 to halt the operation of the motor. Should the cable snap when the motor is being driven in the opposite direction to close the umbrella, operation of the motor is halted by engagement of the guiding member 43 with plunger 72 so as to open limit switch 71, in the manner specified above.

Although the unit 10 for winding-up and paying-out a cable, rope, or other elongated flexible element has been shown and described herein associated with a tiltable garden umbrella, it will be understood that it can be employed for raising and lowering umbrella canopies of umbrellas which are not tiltable and for many other purposes where it is desired to exert a pulling force on a cable, rope or other flexible member or to effect the paying-out or unwinding of a flexible member.

It is to be understood that this invention is not limited to embodiment disclosed in the drawings and that various changes and modifications may be made therein without departing from the scope or spirit of the invention, which is defined in the appended claims.

What is claimed is:

1. A device for winding-up and paying-out a flexible member, comprising, in combination, a screw threaded wind-up member rotatable about its longitudinal axis and having one end of the flexible member secured thereto, guide means in threaded engagement with said wind-up member, means for preventing said guide means from rotating on said wind-up member and thus effecting movement of said guide means longitudinally along said wind-up member in response to rotation thereof, said guide means engaging the flexible member and directing the latter from said wind-up member into a path substantially parallel to the axis of the latter, and a reversible motor connected with said wind-up member for selectively rotating the latter in one direction, whereby the elongated flexible member is wound on the wind-up member to exert a pull along said path, and in the opposite direction, whereby the flexible member is unwound from the wind-up member and payed-out along said path.

2. A device for winding-up and paying-out a cable, comprising an elongated screw threaded wind-up member rotatable about its longitudinal axis and having an end of the cable secured to said wind-up member adjacent one end of the latter, guide means in threaded engagement with said wind-up member, means for preventing said guide means from rotating on said wind-up member and thus effecting movement of said guide means longitudinally along said wind-up member in response to rotation of the wind-up member, said guide means engaging the cable and directing the latter from said wind-up member into a path substantially parallel to said axis of the latter, and a reversible motor connected with said wind-up member for selectively rotating the latter in opposite directions so that, during rotating in the direction causing movement of said guiding means away from said one end of the wind-up member, the cable is wound on said wind-up member and a pull is thereby exerted along said path and, during rotation of the wind-up member in the opposite direction, the cable is unwound from said wind-up member and payed-out along said path.

3. A device as in claim 2; wherein said wind-up member has screw threads with a pitch to receive successive convolutions of said cable when the latter is wound on the wind-up member, and said guide means is in threaded engagement with said screw threads.

4. A device as in claim 3; wherein said guiding means includes a guide member having a bore which is screw threaded, at least in part, and receives said screw threaded wind-up member, said guide member further having an axially directed passage and a second passage extending from said bore to said axial passage, and a rotatable guide roller mounted in said guide member between said second and axial passages, the cable passing from said wind-up member through said second passage and then around said guide roller and through said axial passage.

5. A device for winding-up and paying-out an elongated flexible element, comprising an elongated screw threaded wind-up member rotatable about its longitudinal axis and having an end of the flexible element secured to said wind-up member adjacent one end of the latter, non-rotatable guide means in threaded engagement with said wind-up member to move along the latter in response to rotation of the wind-up member, said guide means engaging the flexible element and directing the latter from said wind-up member into a path substantially parallel to said axis of the latter, a reversible electric motor in axial alignment with said wind-up member, reduction gear means operatively connected between said motor and said wind-up member, and electrical energizing means for selectively operating said motor in opposite directions so that, during rotation of the wind-up member causing movement of said guiding means away from said one end of the wind-up member, the flexible element is wound on said wind-up member to exert a pull along said path and, during rotation of the wind-up member in the opposite direction, the flexible element is unwound from said wind-up member and payed-out along said path.

6. A device as in claim 5; further comprising emergency switch means interposed in said electrical energizing means to halt the operation of said motor when the flexible element snaps, said emergency switch means including actuating means disposed adjacent the end of said wind-up member opposite said one end and operated by engagement with said guide means when said guide means reaches the end of said wind-up member remote from said one end.

7. A device as in claim 5; comprising limit switch means interposed in said electrical energizing means to halt the operation of said motor upon a predetermined winding-up and paying-out of the flexible element.

8. A device as in claim 7; wherein said limit switch means includes at least one normally closed switch, and actuating means for opening said switch which is operated by engagement by said guide means at a predetermined position of the latter along said wind-up member.

9. An umbrella comprising a pole; a canopy on said pole which is adapted to be opened and closed; and means for opening and closing the canopy comprising a runner, a cable connected to said runner extending downwardly through said pole and a device disposed in said pole for pulling downwardly on said cable and for paying-out the latter, said device comprising an elongated screw threaded wind-up member rotatable about its longitudinal axis with the latter extending parallel to the axis of said pole and having an end of said cable secured to said wind-up member adjacent one end of the latter, guide means in threaded engagement with said wind-up member, means for preventing said guide means from rotating on said wind-up member and thus effecting movement of said guide means longitudinally along said wind-up member in response to rotation of said wind-up member, said guide means engaging said cable and directing the latter from said wind-up member into a path substantially parallel to said axis of the latter, and a reversible motor connected with said wind-up member for selectively rotating the latter in opposite directions so that, during rotation in the direction moving said guide means away from said one end of the wind-up member, said cable is wound on said wind-up member to exert a downward pull on the cable and open the umbrella and during rotation of said wind-up member in the opposite direction, said cable is unwound from the wind-up member and thereby payed-out along said pole to permit the runner to descend and close the umbrella.

10. A tiltable umbrella comprising, in combination, a lower pole; an upper pole pivoted on said lower pole and supporting a canopy which is adapted to be opened and closed; means for opening and closing the canopy and for tilting the upper pole relative to the lower pole upon continued actuation thereof following opening of the canopy, comprising, a runner, a cable extending downwardly through said upper and lower poles and connected at one end to said runner and at the other end to a device for pulling downwardly on said cable and for paying-out the latter, said device comprising an elongated cylindrical casing in said lower pole, an elongated screw threaded wind-up member mounted rotatably in said casing and coaxial with the latter, the lower end of said cable being secured to the lower end of said wind-up member, a guide member axially slidable in said casing positioned in threaded engagement with said wind-up member, means for preventing rotation of said guide member on said wind-up member and permitting movement of said guide member longitudinally along said wind-up member in response to rotation of said wind-up member, means on said guide member directing said cable tangentially from said wind-up member into a path parallel to the axis of said casing, and reversible motor operated means connected with said wind-up member for selectively rotating the latter in opposite directions so that, during rotation in the direction moving said guide member upwardly, said cable is wound on said wind-up member to exert a downward pull on said cable and, during rotation of said wind-up member in the opposite direction, said cable is unwound from said wind-up member and thereby payed-out upwardly in said poles.

11. The combination as in claim 10; wherein said reversible motor operated means includes a reversible electric motor in a housing abutting said casing and circuit means for energizing said motor to rotate said wind-up member in opposite directions, said circuit means including a first limit switch actutable by said guide member at a predetermined position during downward movement of the latter to halt paying-out of the cable, and a second limit switch actuable upon tilting of said upper pole to halt downward pulling of the cable.

12. The combination as in claim 11; wherein a reducing gear train is disposed in said casing and operatively connects said motor to said wind-up member.

13. A device for winding-up and paying-out a cable within a hollow pole, comprising an elongated screw threaded wind-up member rotatably mounted within said pole coaxially with the latter and having an end of the cable secured to the wind-up member adjacent one end of the latter, guide means in threaded engagement with said wind-up member within the pole, means engaging said guide means to prevent rotation thereof upon rotation of said wind-up member and to effect movement of said guide means longitudinally along the wind-up member in response to rotation of the latter, said guide means engaging the cable and directing the latter tangentially from the surface of the wind-up member into a path parallel to the axis of the pole, and a reversible motor connected with said wind-up member for selectively rotating the latter in opposite directions so that, during rotation of said wind-up member in the direction moving said guide means away from said one end, the cable is wound on said wind-up member and, during rotation of said wind-up member in the opposite direction, the cable is unwound therefrom.

References Cited in the file of this patent

UNITED STATES PATENTS

| | | |
|---|---|---|
| 2,721,569 | Militano | Oct. 25, 1955 |
| 3,003,748 | Musser | Oct. 10, 1961 |
| 3,024,001 | Worden et al. | Mar. 6, 1962 |